(No Model.)

L. M. RUMSEY.
Drive Chain.

No. 230,662. Patented Aug. 3, 1880.

Witnesses:

Inventor:

UNITED STATES PATENT OFFICE.

LEWIS M. RUMSEY, OF ST. LOUIS, MISSOURI.

DRIVE-CHAIN.

SPECIFICATION forming part of Letters Patent No. 230,662, dated August 3, 1880.

Application filed June 26, 1880. (No model.)

*To all whom it may concern:*

Be it known that I, LEWIS M. RUMSEY, a citizen of the United States, residing at St. Louis, county of St. Louis, and State of Missouri, have invented a new and useful Improvement in Drive-Chains, of which the following is a specification.

Detachable links for drive-chains for use in agricultural machinery, elevators, &c., and adapted to be run on sprocket-wheels, have been made of various forms, all, however, having the same general features of construction—viz., an open hook at one end of the link and the opposite end bar or one of the side bars either made eccentric to the general plan of the link or with reduced portions to enable them to be coupled or uncoupled, to lengthen or shorten the chain or to replace a link in case of the accidental breaking of one of the links. These links have been constructed so as to be detachable when brought into some unusual relation to each other, such as they would rarely if ever assume when in working position. All of these links, so far as I have any knowledge, have been made of cast metal, which was afterward annealed or made malleable.

The coupling-hooks on the links have all been made to extend outwardly from the body of the links, and with their openings or throats in an upward direction, and this construction has been such as to require their being cast with a core, or the construction had to be so changed as to avoid coring, thus either producing a faulty or expensive link or one extremely difficult to make.

To overcome these objections, as well as to cheapen the cost of the article, is the object of my invention, which consists in forming a link preferably of wire or spring metal, and which I will now proceed to describe, so that any person skilled in the art may construct and use the same.

Figure 1:
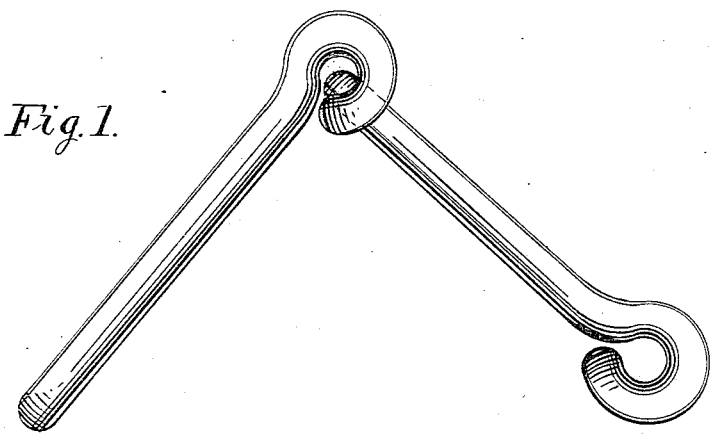
Figure 2:
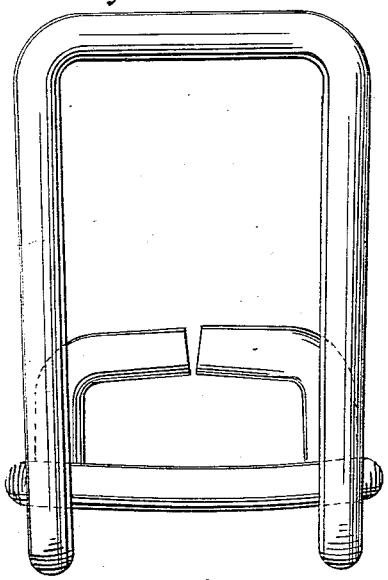
Figure 3:
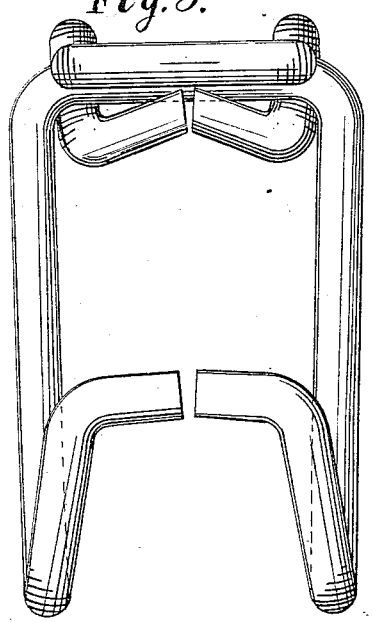

In the drawings forming a part of this specification, Figure 1 is an enlarged side view of two links coupled. Fig. 2 is a front view. Fig. 3 is a plan view.

I prefer to form the links of round or oval wire, and each link is constructed of a single piece, which is first bent to form the plain end bar, and afterward bent at right angles, or nearly so, to form the side bars, the blank thus formed having substantially the form of the letter U. The ends of the wire are now bent to form nearly circular eyes, one at each side of the link, or, in other words, one on each side bar. The free ends of the wire are then bent inwardly from each side toward the center of the link until they are in contact, or nearly so, thus forming another end bar, the distance of which from the extreme outer portion of the link will be proportionate to the size of the wire used and the length of the eyes on bearings.

It will be observed that, instead of having the hooks bent outwardly and with the throat or opening in an upward direction, my link has the hook-like portion bent inwardly or toward the open rectangular portion of the link, and has the throat or opening in a downward instead of an upward direction, thus avoiding any projecting portions which are liable to catch on other parts of the machinery, which either results in injury thereto or breaks the link.

The links may be constructed so as to have the free ends of the wire in the end bar opposite the hook-like portion, or in one of the side bars; but I prefer the construction first described, for the reason that the links are less liable to be separated at the ends.

In the construction of a link with the coupling-hook or hooks bent inwardly and downwardly, I do not limit myself to the use of wire, as it is obvious that such a link might be made of cast metal without departing from the spirit of my invention; but I have found that a link of wire is easier of construction as well as cheaper, and that a chain made up of such links will bear greater tensile strain, though containing much less metal, and, furthermore, I am enabled to utilize the elastic property of the wire in the act of coupling and uncoupling.

To couple my links the plain end bars are inserted underneath the hook-like portion, with the link to be coupled held at an angle of about forty-five degrees or less; the bar is forced underneath the hook-like portion, which, by virtue of its elastic character, yields and afterward assumes its normal form, and the link is then partially revolved until the links are in the same plane. The inherent spring of the metal allows of the free ends being slightly raised to admit the end bar, and when the link is over or in a working position the side bars, bearing against the outer sides of the eyes, draw the free ends tightly together, thus avoiding all soldering as well as preventing the accidental disarrangement of the links.

To uncouple the links the operation is reversed.

I am aware that it is not new to make links of wire with permanently-closed hooks, and I am also aware that wire links have been made with permanently-open hooks, but without any means of locking the hooks together, and at the same time allowing them to be detachable; and such I do not claim as my invention; but

What I claim as new, and desire to secure by Letters Patent, is—

1. A detachable link for drive-chains, constructed of a single piece of wire or spring metal, having a permanently open hook-like coupler formed on one end, and adapted to be coupled with the plain end bar of an adjacent link or uncoupled therefrom when the links are placed at an angle to each other, but locked in pivotal connection therewith when the chain is in working condition, as set forth.

2. A detachable link for drive-chains having the lip or free end of its hook-like coupler extending inwardly toward the center of the link and its throat open downwardly, substantially as described.

3. A link for drive-chains formed of a single piece of wire or spring metal having a plain end bar, two side bars substantially at right angles thereto, and having the free ends of the side bars first bent to form bearings for the end bar of an adjacent link, and then bent inwardly and downwardly toward the center of the link, as and for the purpose set forth.

L. M. RUMSEY.

Witnesses:
A. M. WOOD,
E. S. HOLMES.